United States Patent
Wieschemann et al.

(10) Patent No.: US 11,247,672 B2
(45) Date of Patent: Feb. 15, 2022

(54) AUTOMATICALLY GUIDED TRANSPORTATION VEHICLE FOR CONTAINERS AND METHOD FOR OPERATING THE SAME AND ALSO SYSTEM WITH AN AUTOMATICALLY DRIVEN TRANSPORTATION VEHICLE

(71) Applicant: Konecranes Global Corporation, Hyvinkää (FI)

(72) Inventors: Armin Wieschemann, Oberhausen (DE); Stefan Aldejohann, Langenfeld (DE); Heiko Schulz, Leverkusen (DE); Jan Philipp Schmidt-Ewig, Essen (DE); Heinz Eichner, Ratingen (DE)

(73) Assignee: Konecranes Global Corporation, Hyvinkää (FI)

( * ) Notice: Subject to any disclaimer, the term of this patent is extended or adjusted under 35 U.S.C. 154(b) by 248 days.

(21) Appl. No.: 16/484,758

(22) PCT Filed: Feb. 12, 2018

(86) PCT No.: PCT/EP2018/053443
§ 371 (c)(1),
(2) Date: Aug. 8, 2019

(87) PCT Pub. No.: WO2018/149789
PCT Pub. Date: Aug. 23, 2018

(65) Prior Publication Data
US 2020/0156627 A1    May 21, 2020

(30) Foreign Application Priority Data
Feb. 15, 2017    (DE) .......................... 10 2017 103 097.2

(51) Int. Cl.
*B60W 10/04*    (2006.01)
*B60W 10/18*    (2012.01)
(Continued)

(52) U.S. Cl.
CPC ............ *B60W 30/09* (2013.01); *B60W 10/04* (2013.01); *B60W 10/18* (2013.01);
(Continued)

(58) Field of Classification Search
CPC . B60W 30/09; B60W 30/095; B60W 50/0097
See application file for complete search history.

(56) References Cited

U.S. PATENT DOCUMENTS

| 2003/0055563 | A1* | 3/2003 | Jonas Lars | ............ G01S 13/931 |
| | | | | 701/301 |
| 2007/0282530 | A1 | 12/2007 | Meister et al. | |

(Continued)

FOREIGN PATENT DOCUMENTS

| CN | 102096803 A | 6/2011 |
| CN | 104169994 A | 11/2014 |

(Continued)

OTHER PUBLICATIONS

International Search Report of the International Searching Authority from corresponding Patent Cooperation Treaty (PCT) Application No. PCT/EP2018/053443, indicated completed on May 24, 2018.

(Continued)

*Primary Examiner* — Anshul Sood
(74) *Attorney, Agent, or Firm* — Gardner, Linn, Burkhart & Ondersma LLP

(57) ABSTRACT

A transportation vehicle for containers has a vehicle controller for automatically driving and controlling the speed of the transportation vehicle. The transportation vehicle includes a sensor apparatus for object identification, with the sensor apparatus interacting with the vehicle controller such that a movement region of the transportation vehicle can be ascertained. The transportation vehicle is configured to come to a standstill within the movement region by a braking process during a braking time, and that a movement (Continued)

region of an object that is identified by the sensor apparatus can be ascertained, with the object being moved within the movement region during the braking time of the transportation vehicle, so that the permissible speed of the transportation vehicle can be automatically reduced by the vehicle controller, and so that the two movement regions do not touch after the reduction in the permissible speed.

16 Claims, 9 Drawing Sheets

(51) Int. Cl.
  *B60W 30/09* (2012.01)
  *B60W 30/095* (2012.01)
  *G05D 1/00* (2006.01)

(52) U.S. Cl.
  CPC ......... *B60W 30/095* (2013.01); *G05D 1/0088* (2013.01); *B60W 2520/10* (2013.01); *B60W 2554/4041* (2020.02); *B60W 2554/4042* (2020.02); *B60W 2554/4044* (2020.02); *B60W 2710/18* (2013.01); *B60W 2720/106* (2013.01)

(56) References Cited

U.S. PATENT DOCUMENTS

| | | | |
|---|---|---|---|
| 2010/0057361 A1 | 3/2010 | Caveney et al. | |
| 2013/0179047 A1* | 7/2013 | Miller | B60W 30/143 701/70 |
| 2013/0236279 A1 | 9/2013 | Franzen et al. | |
| 2015/0187217 A1 | 7/2015 | Yao et al. | |
| 2018/0231974 A1* | 8/2018 | Eggert | B60W 30/085 |
| 2019/0001973 A1* | 1/2019 | Matsunaga | B60W 30/095 |
| 2019/0005821 A1* | 1/2019 | Matsunaga | B60W 10/18 |
| 2019/0193959 A1 | 6/2019 | Wieschemann et al. | |

FOREIGN PATENT DOCUMENTS

| | | |
|---|---|---|
| CN | 104183157 A | 12/2014 |
| DE | 102005049159 | 5/2006 |
| DE | 102005054359 | 5/2007 |
| DE | 102008062916 | 6/2010 |
| DE | 102010031038 | 1/2012 |
| DE | 102012108768 | 3/2014 |
| EP | 2637954 | 9/2011 |
| EP | 2694424 | 6/2015 |

OTHER PUBLICATIONS

Written Opinion of the International Searching Authority from corresponding Patent Cooperation Treaty (PCT) Application No. PCT/EP2018/053443, indicated completed on May 24, 2018.
International Preliminary Examination Report from corresponding Patent Cooperation Treaty (PCT) Application No. PCT/EP2018/053443 transmitted Jun. 26, 2019.
Co-pending U.S. Appl. No. 16/338,242, filed Mar. 29, 2019, entitled Method for Automatically Positioning a Straddle Carrier for Containers, and Straddle Carrier for This Purpose.
Co-Pending U.S. Appl. No. 16/312,783, filed Dec. 21, 2018, entitled System for Transporting Containers, Particularly Iso Containers, Using Heavy Goods Vehicles.
Preliminary Report on Patentability of the International Searching Authority in English from corresponding Patent Cooperation Treaty (PCT) Application No. PCT/EP2018/053443, completed Jun. 26, 2019.

* cited by examiner

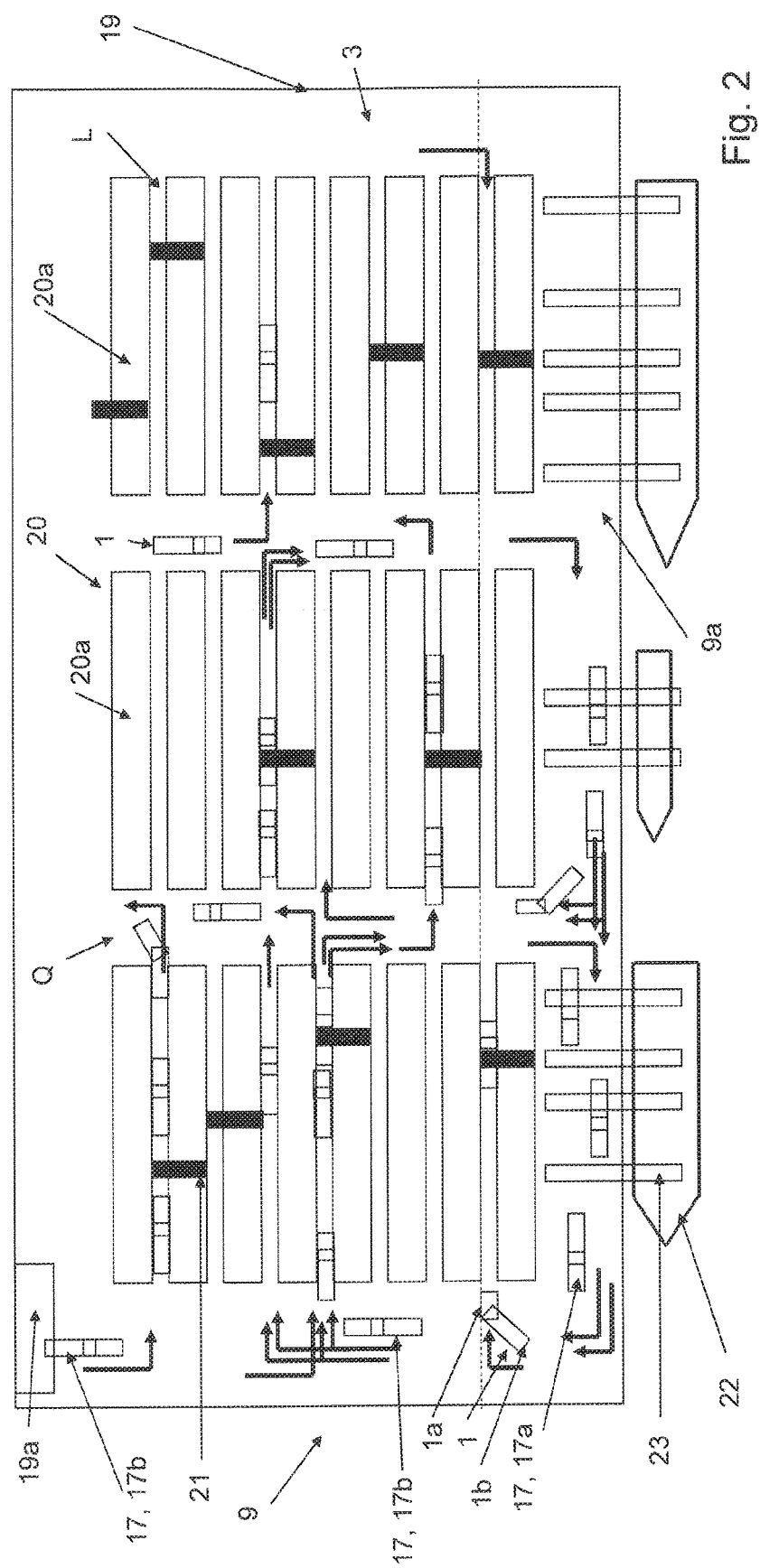

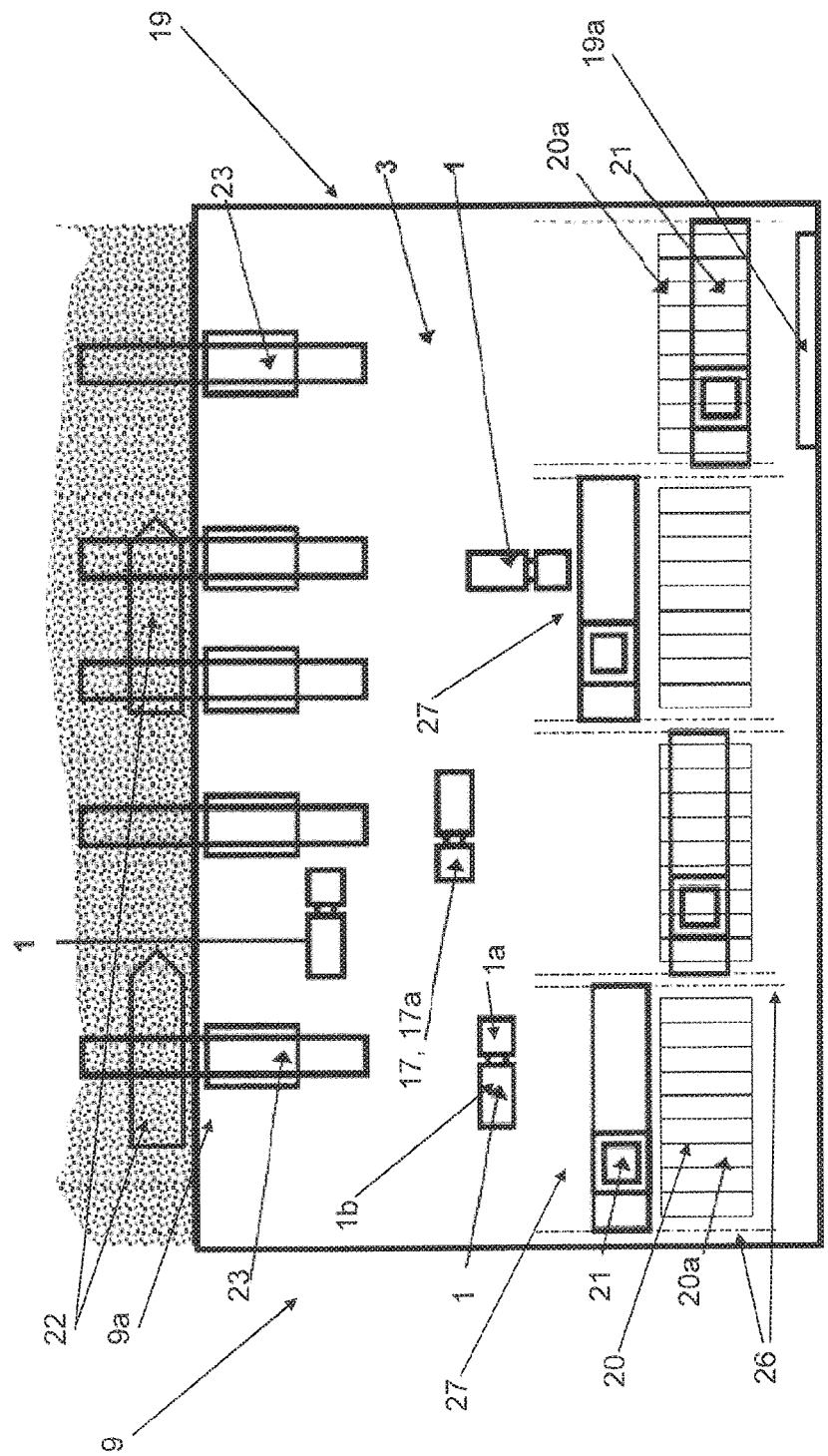

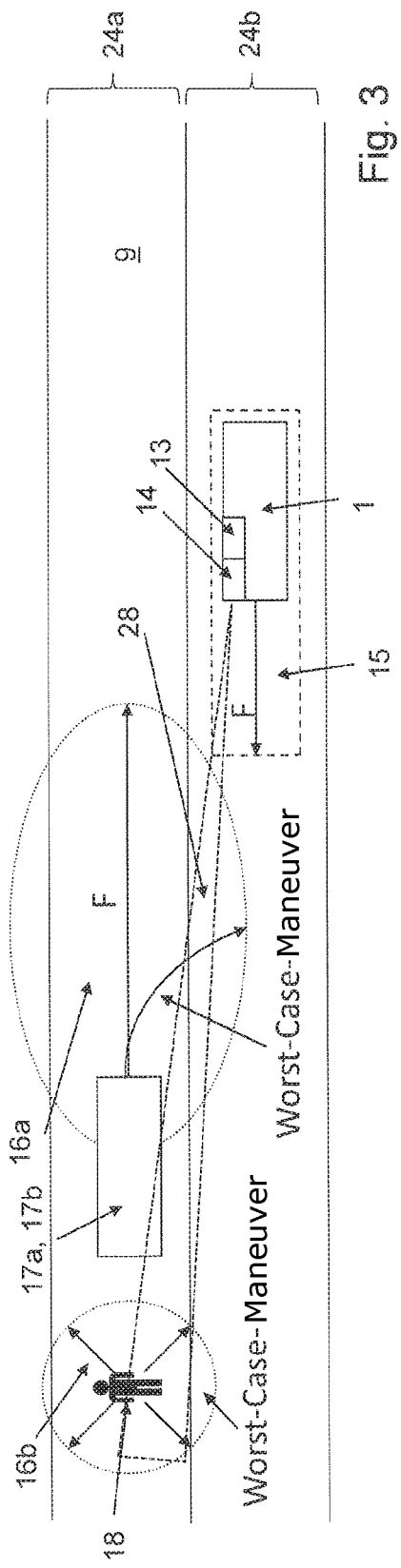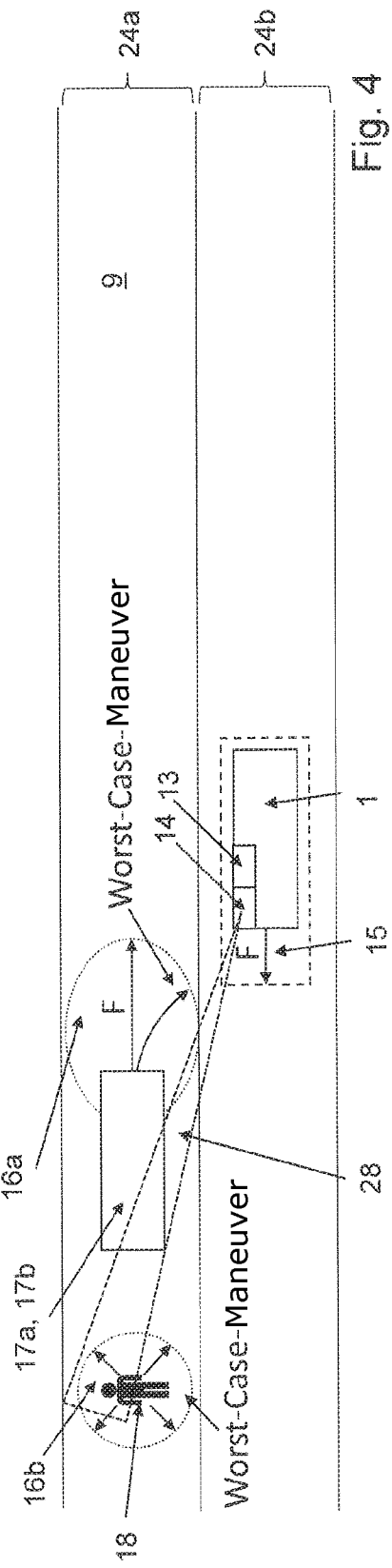

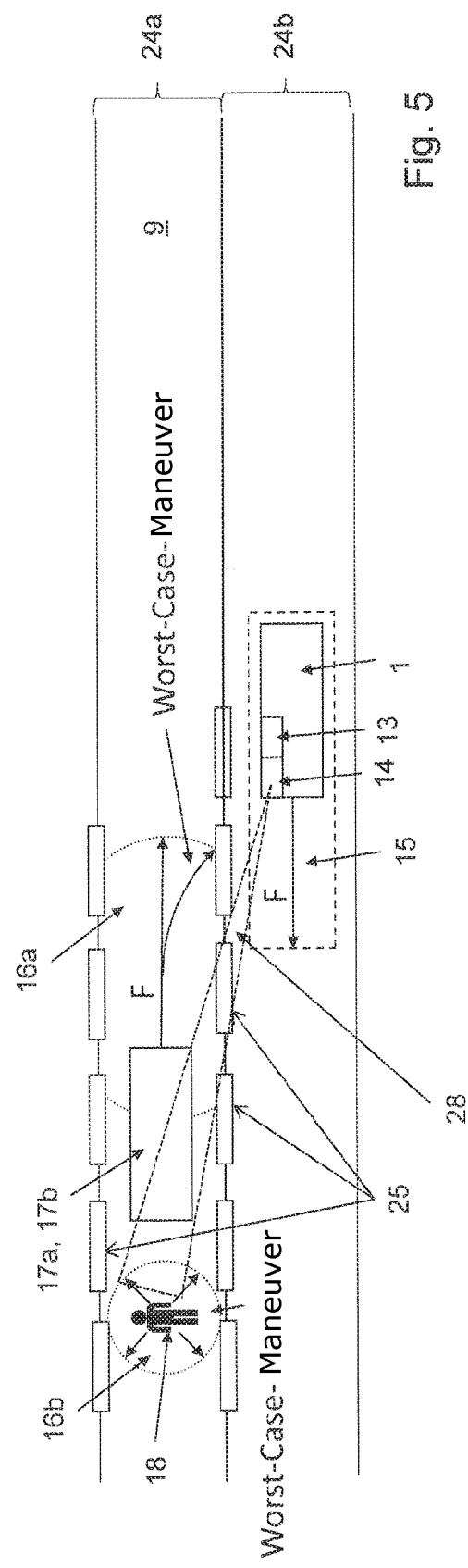

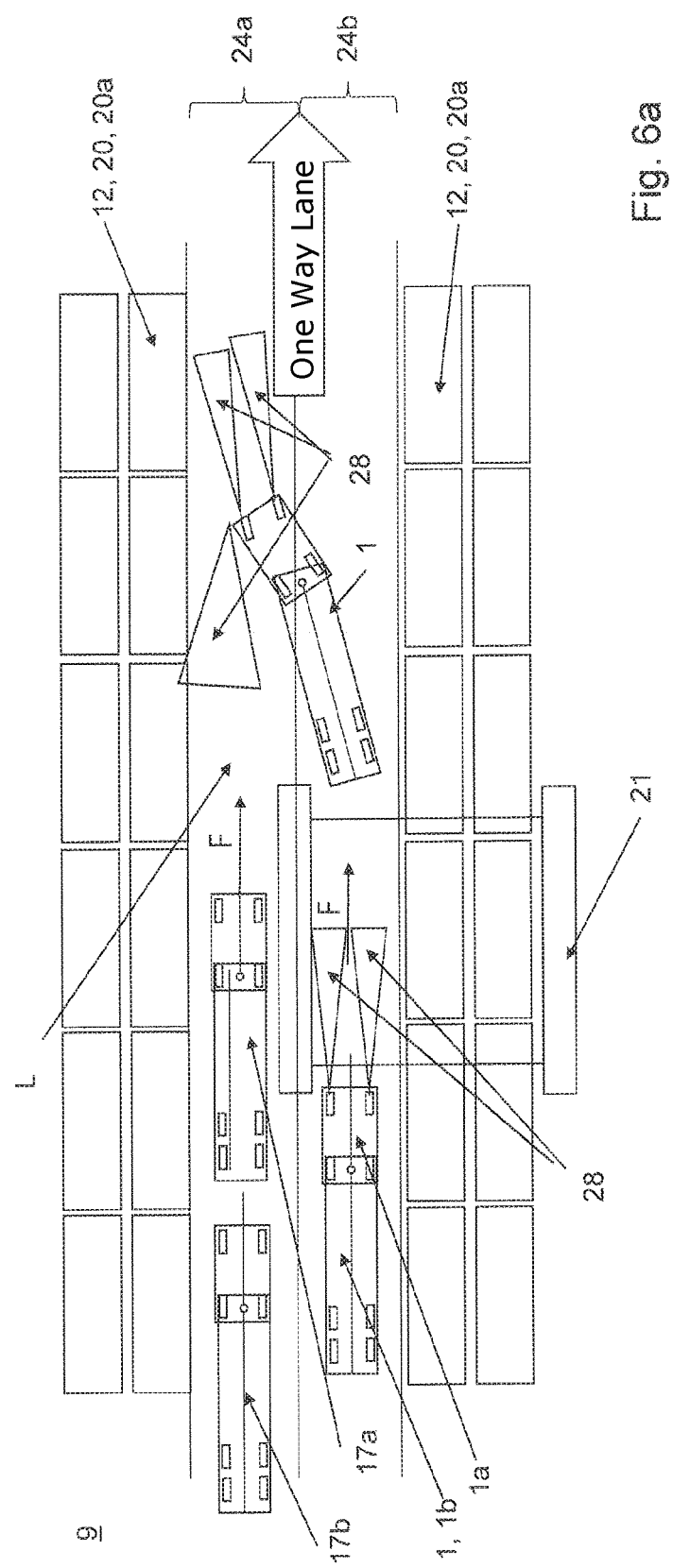

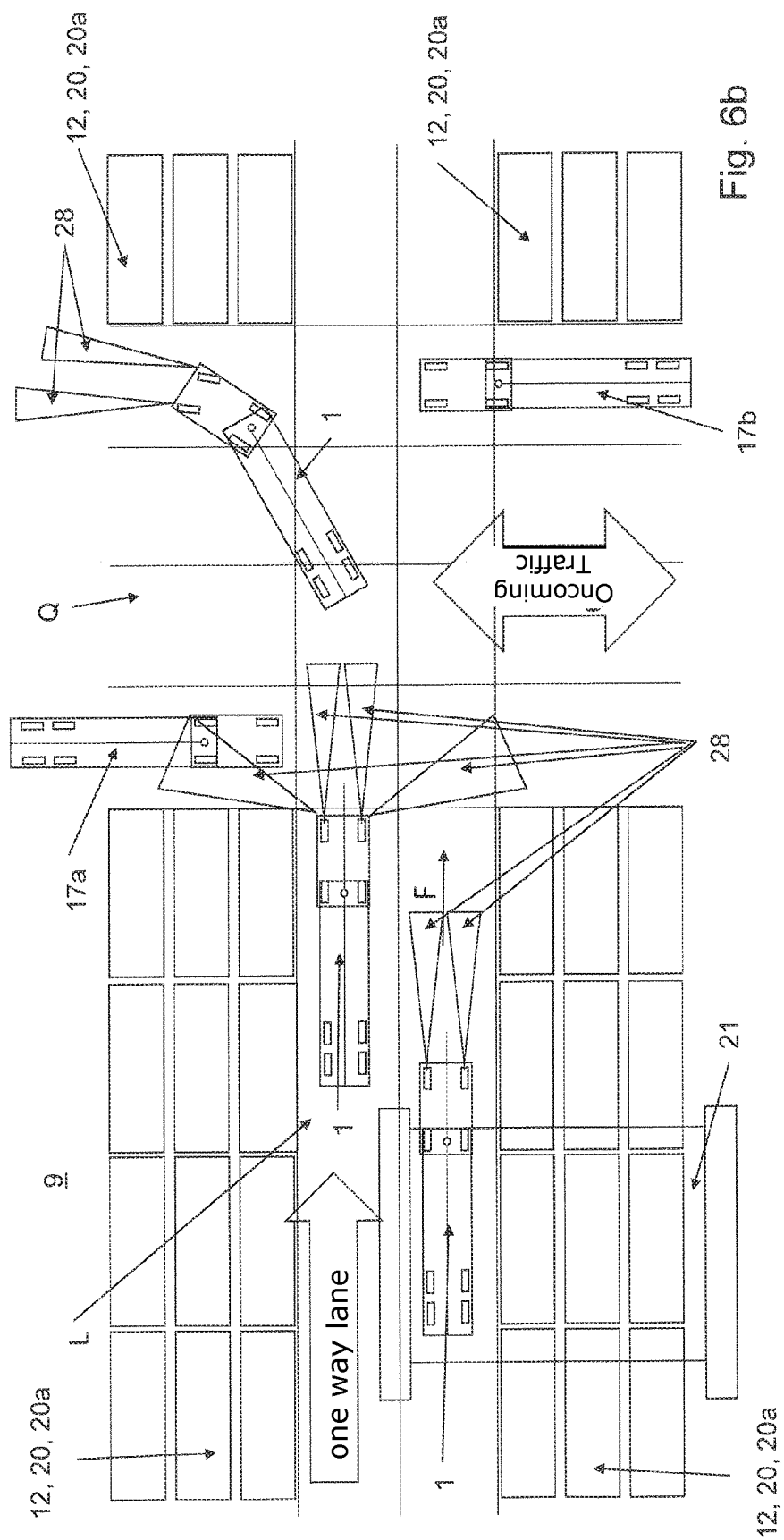

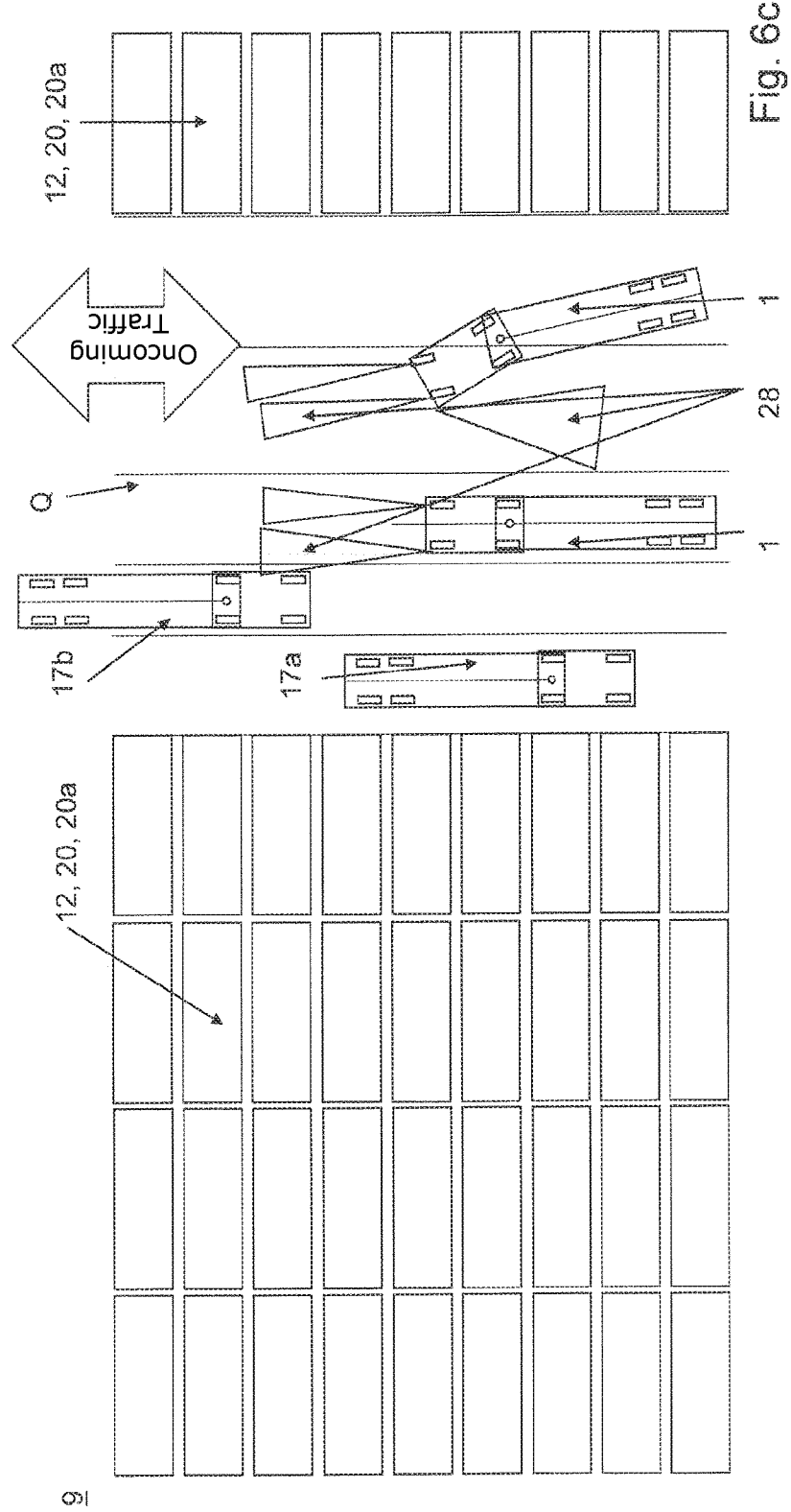

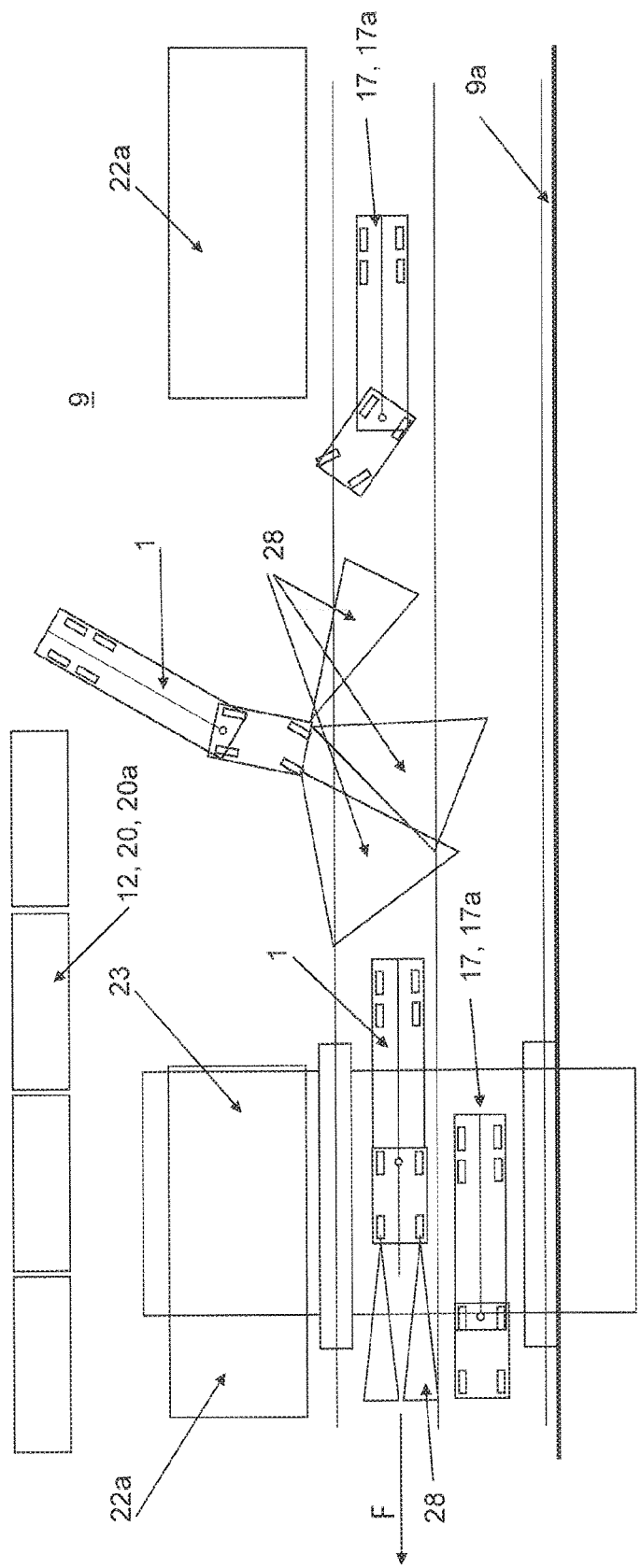

AUTOMATICALLY GUIDED TRANSPORTATION VEHICLE FOR CONTAINERS AND METHOD FOR OPERATING THE SAME AND ALSO SYSTEM WITH AN AUTOMATICALLY DRIVEN TRANSPORTATION VEHICLE

CROSS REFERENCE TO RELATED APPLICATION

The present application claims the priority benefits of International Patent Application No. PCT/EP2018/053443, filed Feb. 12, 2018, and claims benefit of German patent application DE 10 2017 103 097.2.

BACKGROUND AND FIELD OF THE INVENTION

The invention relates to a transport vehicle for containers, and in particular to a system and method for operating a transport vehicle for containers.

Transport vehicles in terms of the present invention are ground conveyor vehicles which are designed as heavy-duty vehicles and are configured for handling and/or transporting containers. Accordingly, the containers which are to be transported or handled can weigh up to 40 t in particular in the case of ISO containers in the loaded state and can have normed or at least standardised lengths of e.g. 10, 20, 40, 45, 53 or 60 foot. The two last-named lengths have hitherto been used exclusively in North America as non-ISO-normed containers. In this regard, ISO containers are understood to be normed large-volume or sea-freight containers which are used in the international transportation of goods. In this regard, containers can also be other normed or at least standardised load carriers, such as e.g. swap bodies, in particular swap containers or swap trailers.

Corresponding transport vehicles can also be part of a terminal, e.g. a port terminal. In this case, the transport vehicles are involved in the handling of containers between at least two transport means of the same or different type, e.g. between ships, road vehicles and/or rail vehicles. Ships and/or rail vehicles as well as corresponding transport vehicles are loaded and unloaded accordingly. In this regard, the non-rail-bound but freely movable transport vehicles transport the containers e.g. on the waterside of a container store of the terminal between the container store and a container bridge for loading or unloading a ship with containers docked at the quay. Therefore, correspondingly combined transportation between water, road and/or rail can also take place in the terminals.

Transport vehicles in terms of the present invention thus include in particular special purpose vehicles which are operated as internal transport vehicles only internally within such terminals and are generally not designated and designed or authorised for external use on public roads. Therefore, these transport vehicles are to be operated strictly separately from vehicles on public roads. For example, special container transport vehicles which have a loading surface delimited by mutually spaced-apart guide elements are used as a possible vehicle type of such transport vehicles. The guide elements are also referred to as position adapters and guide a container to be picked up or its corner fittings onto the loading surface. For this purpose, the guide elements extend with their guide surfaces inclined outwards and upwards away from the loading surface. In this case, the loading surface can also be designed as part of a lifting platform which can be lifted and lowered. Such container transport vehicles are known e.g. from EP 2 637 954 B1.

A towing vehicle which is referred to as a terminal truck or terminal tractor can also form, in its own right or together with one or a plurality of trailers as a type of trailer truck, a vehicle type of internal transport vehicles in terms of the present invention. Their loading surface for receiving the load carriers is then not provided, as in the case of the aforementioned special container transport vehicles, on the towing vehicle itself but instead in each case on the trailer(s) and can likewise be delimited by guide elements as described above. Such transport vehicles are known e.g. from DE 10 2012 108 768 A1.

Gantry lift devices also represent a vehicle type of internal transport vehicles in terms of the present invention. These transport vehicles are described e.g. in EP 2 694 424 B1. Such gantry lift devices, which are also called gantry lift stacker trucks, gantry stacking trucks, straddle carriers, van carriers, shuttle carriers or runners, are used not only as a transport vehicle for container transport in horizontal transportation but are also used in particular as special handling devices for ISO containers. With the aid of a lifting device and a load picking-up means defined as a spreader, gantry lift devices can lift containers and place them down at a target location after transportation. Since the gantry lift devices have a spider leg-like construction, they can travel over a container resting on the ground or on another container and thus additionally also transport a raised container depending on construction. In dependence upon the construction height, the gantry lift devices are designated e.g. as 1-over-3 devices, 1-over-2 devices etc. A 1-over-3 device can place a container down on 3 stacked containers, pick up the uppermost one of 4 stacked containers or travel over 3 stacked containers with a picked-up container.

The aforementioned internal transport vehicles can be guided manually and can be actively manually controlled accordingly in particular during acceleration, braking and steering by drivers typically also travelling in the vehicles. For this purpose, manually guided transport vehicles have a corresponding vehicle controller and typically also a driver's cab, from which manual action on the vehicle controller can be effected for the purpose of manual guiding. Alternatively, the internal transport vehicles can also be automatically guided and can be controlled in an automated manner accordingly in particular during acceleration, braking and steering in terms of so-called automated guided vehicles (AGV). For this purpose, automatically guided transport vehicles have a suitable vehicle controller and so, by reason of the automatic control or navigation effected thereby, it is not necessary or possible for a driver also travelling in the vehicle to perform any active manual action. In this sense, an automatically guided transport vehicle can also be manned if a driver also travels in said vehicle, but in this case not in the sense of having to or being able to actively act on the controller of the transport vehicle as a vehicle driver. Transport vehicles which are driverless but are manually remote-controlled by a vehicle driver are not deemed to be automatically guided vehicles but instead are deemed to be manually guided vehicles.

Conventional lorries, in particular trailer trucks which are authorised and used for transporting containers on public roads are likewise known. Such vehicles which are also defined as road trucks likewise constitute a vehicle type of manually guided transport vehicles in terms of the present invention. These transport vehicles are defined hereinafter as external, manually guided transport vehicles since they can also be used on public roads outside corresponding terminals and in general can be used predominantly on public roads.

European patent specification EP 2 637 954 B1 discloses a terminal for handling containers which, as a separate operating area, has an automatic area and a manual area which is separated therefrom by a fence. Only internal, automatically guided container transport vehicles and not internal or external manually guided container transport vehicles may be operated in the automatic area which is located waterside in relation to a container store. The automatic area is protected by a fence to prevent any unauthorised entry by persons and to prevent manually guided transport vehicles from entering.

German laid-open document DE 10 2005 049 159 A1 relates to driverless transport vehicles which are used as part of driverless transport systems, in particular in production facilities. In order to evaluate the surrounding area and to avoid collisions, a laser scanner is used which serves as a sensor apparatus for object recognition and detects distance information relating to an object, which can also be a person, and ascertains a permitted minimum distance in dependence upon a braking characteristic and speed of the transport vehicle. If the detected object moves to within the defined minimum distance, a braking procedure or an evasive manoeuvre is instigated by the evaluating unit. Future movements of the object are not taken into consideration.

German laid-open document DE 10 2005 054 359 A1 discloses a vehicle for driverless transport systems which uses an optical sensor to recognise when an object or person moves into a protective field and in response thereto generates for the purpose of collision avoidance a switch-off command, by means of which the driverless transport system is stopped. Depending upon the direction of travel or speed of the transport system, one protective field can be selected from the plurality of defined protective fields.

German laid-open document DE 10 2010 031 038 A1 describes a method for assisting a driver of a manually guided motor vehicle. The vehicles used are equipped with sensors for detecting non-moving and moving objects in order to assist the respective driver to avoid collisions with corresponding objects. In this case, a determination of the relative speed between the vehicle and the detected object is effected, as is a calculation of the stopping distance which is based thereon and takes into account the reaction time of the driver. An emergency braking procedure is triggered if the distance between the vehicle and object is less than the stopping distance.

German laid-open document DE 10 2008 062 916 A1 likewise describes a manually guided vehicle and a method for ascertaining a probability of a collision of the manually guided vehicle with any animate beings. Depending upon the ascertained probability of a collision, e.g. a warning to the driver or an emergency braking procedure is triggered. In this case, the vehicles are provided with sensing means for detecting information relating to the surrounding area, wherein a physical and physiological movement capability of the animate being and/or empirically ascertained behaviour patterns are also taken into account. A reference to automatically guided container vehicles is not given.

SUMMARY OF THE INVENTION

The present invention provides an improved automatically guided transport vehicle for containers, a method for operating the same and a system comprising an automatically guided transport vehicle which permits particularly safe and in particular collision-free operation.

A transport vehicle for containers which has a vehicle controller, by means of which the transport vehicle can be automatically guided and by means of which a speed of the transport vehicle can be controlled, is improved in accordance with the invention by virtue of the fact that the transport vehicle has a sensor apparatus for object recognition which cooperates with the vehicle controller such that it is possible to ascertain a movement area of the transport vehicle, within which the transport vehicle can come to a standstill by means of a braking procedure during a braking time, and that it is possible to ascertain a movement area of an object recognised by means of the sensor apparatus, within which the object can be moved during the braking time of the transport vehicle, and so the permissible speed of the transport vehicle can be reduced automatically by means of the vehicle controller, and so the two movement areas do not come into contact and in particular do not overlap with one another after the reduction in the permissible speed. In this case, the movement areas are movement areas which are potentially possible and thus theoretically pre-calculated.

Therefore, the present invention provides the recognising, by means of the sensor apparatus, objects in the area surrounding the automatically guided transport vehicle and of determining, evaluating and using information in this respect for a collision-free operation. For this purpose, the sensor apparatus is designed in such a manner that manually guided transport vehicles and/or automatically guided transport vehicles and/or persons and/or other objects, such as e.g. components of cranes or positionally fixed boundaries and lamp posts, can be recognised as objects, in particular as such in each case, and therefore can be distinguished in particular from one another. The recognition or evaluation can take the shape and/or reflections of the respective object into account. For this purpose, an evaluating unit is provided which can be part of the vehicle controller and/or the sensor apparatus and in which typical values relating to the shape and/or reflection of known objects can be stored and provided for a comparison as part of the evaluation. The information which can be ascertained by the sensor apparatus can include a position, movement direction and speed of the object in order to ascertain the movement areas on the basis thereof. For this purpose, the sensor apparatus can comprise e.g. at least one laser sensor and/or a camera and/or a radar sensor and/or an ultrasonic sensor. By taking the information and/or kinematically possible movements or achievable positions and the dedicated speed or minimal braking time of the automatically guided transport vehicle into account, it is possible to forecast whether there is a risk of a collision with the respectively recognised object or not. If there is such a risk, the permissible speed for the automatically guided transport vehicle is reduced or a stop is even initiated if required. This advantageously ensures that an automatically guided transport vehicle can stop before a collision with other objects, e.g. manually guided transport vehicles or persons located in the transport area, can occur. After the vehicle has stopped, a possible collision can still be caused only by a movement of the object itself, but not by a movement of the automatically guided transport vehicle.

By means of the aforementioned sensor apparatus, the automatically guided transport vehicle can also recognise other automatically guided transport vehicles and distinguish them in particular from one another and also from other objects, in particular from manually guided transport vehicles. However, since in the case of a recognised automatically guided transport vehicle the recognising vehicle and also the recognised vehicle travel specified routes of a management system and therefore a collision on account of a corresponding route specification is excluded, it is not necessary to implement any speed adaptation. Therefore, the speed of the automatically guided transport vehicles is not reduced automatically as a result of another automatically guided transport vehicle being recognised. It is only when the recognised object is not an automatically guided transport vehicle that an automatic reduction in the speed of the automatically guided transport vehicle is thus considered in dependence upon the respective movement areas.

Safety is increased further by the fact that the movement area of the recognised object comprises kinematic limits of a worst-case manoeuvre of the object or can be ascertained on the basis thereof. This includes the positions of the object which can be achieved during the braking time by possible movements of the object. Corresponding values for the kinematic limits can be stored for diverse objects, in particular diverse vehicle types and persons, and can be provided to the vehicle controller for a corresponding evaluation and allocation as part of the procedure of ascertaining the movement area.

In a structurally simple manner, provision is made that the sensor apparatus has a detection region which is dimensioned such that an object can be recognised before the movement areas of the transport vehicle and of the object come into contact with one another. This permits a particularly early reduction in the speed of the automatically guided transport vehicle and thus further increased safety during operation thereof in mixed traffic.

Moreover, provision is made in an advantageous manner that the vehicle controller and the sensor apparatus are configured to continuously ascertain the movement areas and to adapt them in particular in dependence upon the current speed of the transport vehicle.

Also provided in an advantageous manner is a system comprising a corresponding, automatically guided transport vehicle, in which a first lane is provided for a manually guided transport vehicle and a second lane is provided for the automatically guided transport vehicle and the two lanes are separated from one another by a barrier in order to delimit the movement area of the manually guided transport vehicle.

A method for operating a transport vehicle for containers which has a vehicle controller, by means of which the transport vehicle is automatically guided and by means of which a speed of the transport vehicle is controlled, is improved by virtue of the fact that a sensor apparatus for object recognition cooperates with the vehicle controller such that a movement area of the transport vehicle is ascertained, within which the transport vehicle can come to a standstill by means of a braking procedure during a braking time, and that a movement area of an object recognised by means of the sensor apparatus is ascertained, within which the object can be moved during the braking time of the transport vehicle, and so the permissible speed of the transport vehicle is reduced automatically by means of the vehicle controller, and so the two movement areas do not come into contact with one another after the reduction in the permissible speed. This increases safety during the operation of a corresponding transport vehicle. For the remainder, the advantages stated in relation to the transport vehicle apply accordingly to the method in accordance with the invention and the possible details of this method described hereinafter.

Accordingly, provision can be made in an advantageous manner that at least one manually guided transport vehicle and/or an automatically guided transport vehicle and/or a person or even said other objects can be recognised as an object, in particular as such in each case, and therefore can be distinguished in particular from one another by means of the sensor apparatus.

Furthermore, provision can be made in an advantageous manner that a position, speed and movement direction of the object and from this the movement area of the object is ascertained by means of the sensor apparatus.

Also, the movement area of the object can be advantageously ascertained on the basis of kinematic limits of a worst-case manoeuvre of the recognised object.

Moreover, provision can be made in an advantageous manner that the sensor apparatus has a detection region which is dimensioned such that an object can be recognised before the movement areas of the transport vehicle and of the object come into contact with one another.

In a further advantageous embodiment of the method, provision is made that the vehicle controller and the sensor apparatus are configured to continuously ascertain the movement areas and to adapt them in particular in dependence upon the current speed of the transport vehicle.

A system comprising a transport vehicle for containers which has a vehicle controller, by means of which the transport vehicle can be automatically guided and by means of which a speed of the transport vehicle can be controlled, is improved in accordance with the invention by virtue of the fact that at least one sensor apparatus for object recognition is provided which cooperates with the vehicle controller such that it is possible to ascertain a movement area of the transport vehicle, within which the transport vehicle can come to a standstill by means of a braking procedure during a braking time, and that it is possible to ascertain a movement area of an object recognised by means of the sensor apparatus, within which the object can be moved during the braking time of the transport vehicle, and so the permissible speed of the transport vehicle can be reduced automatically by means of the vehicle controller, and so the two movement areas do not come into contact and in particular do not overlap with one another after the reduction in the permissible speed. In this case, the sensor apparatus can be arranged on the roadside and e.g. in a positionally fixed manner within a terminal described below, in areas which cannot be readily seen, in particular crossing areas behind corners formed by container stacks, and can transmit information relating to detected objects to the transport vehicle, which approaches the detection region of the sensor apparatus, or the vehicle controller in order to be incorporated into a collision-free operation in this manner in terms of the invention. The remaining functionalities and the cooperation in accordance with the invention between the vehicle controller and the sensor apparatus are effected in such a system in a similar manner to the variant in which the sensor apparatus is part of the transport vehicle and accordingly is not positionally fixed but instead is moved simultaneously with the transport vehicle. The method in accordance with the invention is also suitable for operating the transport vehicles if the sensor apparatus is not part of the transport vehicle but instead is arranged outside said vehicle on the roadside and in particular in a positionally fixed manner. It is also feasible that in such a system, at least one sensor apparatus is provided in each case both on the transport vehicle and also on the roadside in the terminal and cooperates accordingly with the vehicle controller. This is advantageous if the detection region of the sensor apparatus mounted on the transport vehicle does not include corresponding regions, which are difficult to see, and is adversely affected thereby. In this case, the sensor apparatus which is located on the roadside and in particular is positionally fixed is then incorporated in order to recognise objects in the corresponding areas and to transmit information relating thereto to the transport vehicle or the vehicle controller or to provide said information in order to ascertain, in accordance with the invention, the movement areas of the recognised objects.

An exemplified embodiment of the invention is explained in greater detail with reference to the following description.

BRIEF DESCRIPTION OF THE DRAWINGS

FIG. 2 shows a schematic view of a terminal for handling containers;

FIG. 2a shows a schematic view of an alternative terminal for handling containers, FIGS. 3 and 4 each show a schematic view of mixed traffic of automatically guided and manually guided transport vehicles within the terminal of FIG. 2 or 2a;

FIG. 5 shows a further schematic view of mixed traffic of automatically guided and manually guided transport vehicles within the terminal of FIG. 2 or 2a; and FIGS. 6a, 6b, 6c, 6d show typical operating situations within the terminals of FIG. 2 or 2a in plan view.

DESCRIPTION OF THE PREFERRED EMBODIMENTS

Figure 1:
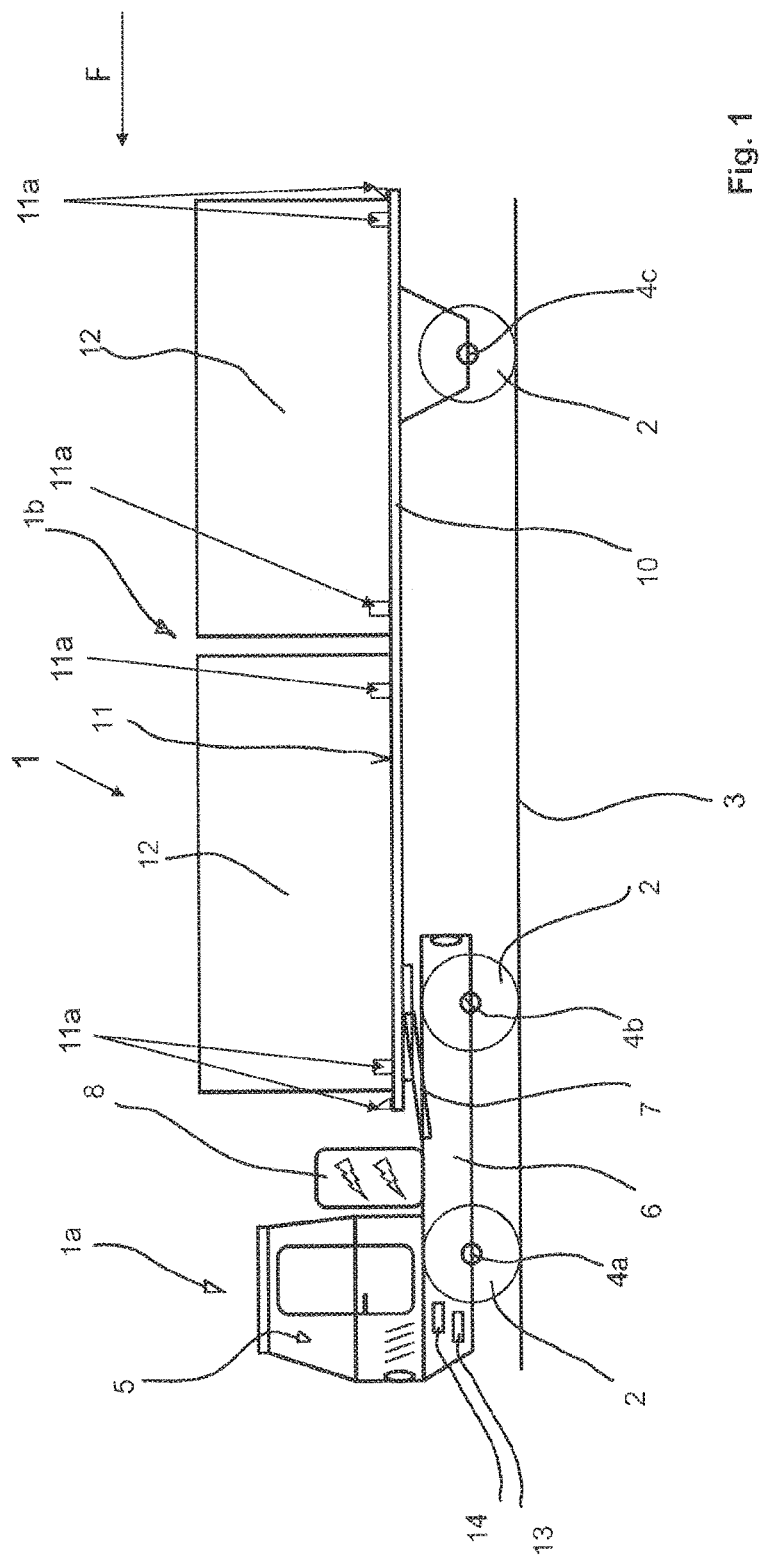
FIG. 1 shows a schematic side view of an automatically guided transport vehicle.

FIG. 1 shows a schematic side view of an automatically guided transport vehicle 1 for containers 12, which is used in a terminal 9 (see the other figures) for handling containers 12. The transport vehicle 1 is designed by way of example as a trailer truck and accordingly comprises a towing vehicle 1a defined as a terminal truck and a trailer in the form of a semi-trailer 1b which is coupled thereto. Such trailer trucks have a total truck weight of up to 200 t in the heavy-duty version. The towing vehicle 1a, in its own right and without the semi-trailer 1b, also constitutes a transport vehicle 1.

The transport vehicle 1 can travel freely on a floor surface 3 by means of wheels 2 and can therefore travel in a floor-bound but not rail-bound manner. Accordingly, the transport vehicle 1 is to be distinguished from rail vehicles. The wheels 2 are each provided with a tyre arrangement which is preferably an air-filled rubber tyre arrangement in the sense of tyres. Moreover, the transport vehicle 1 comprises a travel drive having at least one motor designed as an electric motor and a transmission in order to drive the wheels 2 thereby. The motor and the transmission are not illustrated for reasons of improved clarity. Instead of an electric motor, an internal combustion engine is basically also feasible. The wheels 2 are typically arranged on two axles 4a, 4b in the region of the towing vehicle 1a. If the transport vehicle 1 is designed as a trailer truck, wheels 2 are also arranged on at least one further third axle 4c on the semi-trailer 1b. Basically, it is also possible to provide other numbers of axles and axle arrangements with a corresponding number of wheels 2 if required from a technical point of view.

The transport vehicle 1 or its towing vehicle 1a comprises a chassis 6, on which the wheels 2 are mounted via the front first axle 4a and the rear second axle 4b. Moreover, a fifth wheel plate 7 which is part of a fifth wheel coupling is arranged in the rear region of the chassis 6. The fifth wheel plate 7 can be designed to be able to be lifted and lowered via a hydraulic drive and so the towing vehicle 1a can couple and uncouple the semi-trailer 1b actively and independently. The hydraulic lift of the fifth wheel plate 7 renders it possible to raise fifth wheel loads up to 45 t. A different way of coupling and uncoupling the semi-trailer 1b without a hydraulic lifting option is also feasible, e.g. by means of a coupling mechanism which can be manually actuated. The fifth wheel plate 7 can also be designed in an articulated manner such that the towing vehicle 1a and semi-trailer 1b are not routinely separated and therefore the towing vehicle 1a and semi-trailer 1b are permanently connected as a fixed unit in the form of a trailer truck. Moreover, the chassis 6 supports a battery 8 which powers the electric motor(s) of the travel drive of the transport vehicle 1 and is simultaneously moved therewith. The battery 8 is designed preferably as a rechargeable lithium-ion battery or as a lead battery and is arranged above the chassis 6 or below same e.g. between the two axles 4a, 4b in order to permit simple replacement with a charged battery 8. Alternatively, an additional battery 8 for powering the travel drive can also be arranged on the semi-trailer 1b and can be electrically connected to the travel drive for this purpose.

The semi-trailer 1b has no front axle arranged at the end facing towards the towing vehicle 1a but instead has only one or a plurality of rear axles 4c which are mounted at the end facing away from the towing vehicle 1a under a frame 10 of the semi-trailer 1b. However, a type of front axle of the semi-trailer 1b is formed by the rear axle 4b of the towing vehicle 1a. The semi-trailer 1b also has supports, not illustrated, which are arranged at its front end facing towards the towing vehicle 1a. The supports are provided for placing the semi-trailer 1b down after uncoupling has been effected and, depending upon the configuration of the fifth wheel plate 7, for hitching and unhitching a semi-trailer 1b onto and from the towing vehicle 1a. Moreover, the semi-trailer 1b does not have a dedicated drive.

Furthermore, the transport vehicle 1 or its semi-trailer 1b has, on its frame 10, a substantially flat loading surface 11 for containers 12. In FIG. 1, two containers 12 which are designed as ISO containers and are about 20 foot in length are placed down one behind the other as seen in the direction of travel F of forwards travel of the transport vehicle 1. ISO containers in the above-defined sense have normed corner fittings. The corner fittings can be grasped e.g. by the load picking-up means of a crane designed as a so-called spreader frame, in order to raise the ISO container from the loading surface 11 or place it down on this surface.

In order to be able to guide a container 12 to be transported and in the case of ISO containers in particular its corner fittings as it is being placed down on the loading surface 11 and orientate it in relation to the loading surface 11, the loading surface 11 is delimited at its sides by a plurality of guide elements 11a. For this purpose the guide elements 11a have guide surfaces which extend in an inclined manner. In this case, the guide surfaces extend in a manner directed upwards and outwards away from the loading surface 11 and extend in a manner directed downwards and inwards towards the loading surface 11. The guide elements 11a are preferably disposed in pairs on opposing sides, in particular long sides and/or short sides, of the loading surface 11. The guide surfaces of a pair of guide elements 11a form a type of funnel, the inclined extension of which tapers towards the loading surface 11 in order to achieve the guiding and orientating function. Accordingly, the guide surfaces of a pair of guide elements 11a widen in the upwards direction away from the loading surface 11.

The transport vehicle 1 is automatically guided in the above-defined sense and for this purpose has a vehicle controller 13 which is schematically illustrated in FIG. 1. The driving manoeuvres of the transport vehicle 1 can be automatically controlled by means of the vehicle controller 13 in that transport orders planned e.g. via a management system are performed and travel routes which are specified in this respect are converted by control technology into corresponding driving manoeuvres within terminals 9, described in greater detail below, for handling containers 12. In this regard, steering procedures and speeds as well as accelerations of the transport vehicle 1 are automatically controlled by means of the vehicle controller 13. Furthermore, the transport vehicle 1 can be guided or controlled optionally by a driver also in the above-defined sense manually within the corresponding terminal 9 and so it is also feasible to alternate between manual and automatic guidance of the transport vehicle 1. For the manual variant, a driver's cab 5 including corresponding control means for manually acting on the vehicle controller 13 is arranged in the front region of the towing vehicle 1a. In the case of exclusively automatically guided transport vehicles 1, the driver's cab 5 can remain driverless, as illustrated in FIG. 1, or can even be omitted.

FIG. 2 shows a schematic view of a terminal 9 for handling containers 12 in a plan view. The terminal 9 is designed by way of example as a port terminal. In this case, a plurality of ships 22 can dock at a quay 9a of a port in order to deliver or collect containers 12. In order to load or unload the ships 22, the quay 9a is provided with container bridges 23 which are also defined as ship-to-shore cranes (or STS crane for short) and of which the jibs extend, on the one hand, over the ships 22 and, on the other hand, over the quay 9a. Alternatively, the loading or unloading of the ships 22 can also be performed using so-called wharf cranes, of which the jib is pivoted in this case over the corresponding ship 22 about a vertical axis.

The terminal 9 is typically surrounded by a boundary 19 formed e.g. as a fence or wall and is separated thereby from its outer surrounding area and from public road traffic outside the terminal 9. Moreover, the terminal 9 comprises, within the boundary 19, a container store 20 in which containers 12 can be stacked for short-term intermediate storage in at least one storage area 20a which is also defined as a stack. This can be the case after the containers 12 have been unloaded from the ships 22 and before they are loaded for further transportation outside the terminal 9 onto a road vehicle or rail vehicle or after they have been delivered thereby and before they are loaded onto the ships 22.

Typically, a plurality of storage areas 20a are provided in such a terminal 9 and are arranged next to one another and spaced apart from one another in rows or in a grid pattern. In each storage area 20a, a plurality, e.g. ten, rows of containers are placed down with their long sides next to one another and for each row a plurality, e.g. six, containers 12 are placed down on top of one another. In order to manage the container store 20 or the respective storage areas 20a, i.e. for placing/removing containers 12 into/out of storage at that location, at least one stacking crane is provided which is designed as a gantry crane 21. The gantry cranes 21 representing the handling devices span, with their crane girders supported by gantry supports, the corresponding storage area 20 and the containers 12 stacked therein. For placing and removing containers 12 into/out of storage, the gantry cranes 21 can move across the storage area 20 in the longitudinal direction thereof.

Within the terminal 9, in order to transport containers 12 a common and simultaneous operation of at least one automatically guided transport vehicle 1 is effected, said vehicle being an internal vehicle in the sense of the above definition, and at least one manually guided transport vehicle which likewise can be an internal vehicle in the form of an internal, manually guided transport vehicle 17a or in the sense of the above definition an external vehicle in the form of an external, manually guided transport vehicle 17b, such as e.g. a conventional lorry or trailer truck which is authorised for use on public roads. Internal, manually guided transport vehicles 17a correspond to the manual variant of the transport vehicle 1 comprising a driver's cab 5 as described in FIG. 1. Therefore, mixed traffic of automatically guided transport vehicles 1 and manually guided transport vehicles 17a, 17b is possible in the terminal 9. The internal vehicles transport the containers 12 between the container store 20 or the handling devices thereof and the handling devices located at the quay 9a and in the form of the container bridges 23 or wharf cranes, with which the containers 12 can be handled between the transport vehicles 1 or 17a and the ships 22 and the transport vehicles 1 and 17a can be loaded and unloaded accordingly at the quay 9a. The external, manually guided vehicles 17b can collect containers from the container store 20 or the handling device thereof for further transportation on public roads or, after transportation on public roads, can deliver said containers for intermediate storage in the container store 20. This transport is effected in each case in so-called horizontal transportation.

The gantry cranes 21 allocated to the storage areas 20a as handling devices are designed in FIG. 2 as so-called rubber-tired stacking cranes (rubber-tired gantry cranes—RTG for short) or rail-bound stacking cranes (rail-mounted gantry cranes—RMG for short), which are either guided or controlled manually by an operator also travelling in a crane cab or are guided or controlled in a (semi) automated manner. Accordingly, the terminal 9 schematically illustrated in FIG. 2 is also defined as an RMG or RTG terminal. In the case of this type of terminal, linear aisles and aisles arranged in a grid pattern are provided between the storage areas 20a extending in parallel with the edge of the extending quay 9a, the internal transport vehicles 1 and the internal or external transport vehicles 17a, 17b travelling in said aisles as part of the mixed traffic in common and/or respectively assigned lanes (see the other figures). The transport vehicles 1 and 17a, 17b are loaded and unloaded by the gantry cranes 21 in the longitudinal aisles L of the storage areas 20a running along the long sides (see also FIGS. 6a and 6b). At this location, lanes, serving as transfer lanes, for the transport vehicles 1 and 17a, 17b are provided which are likewise spanned by the respective gantry crane 21. The transport vehicles 1 and 17a, 17b can travel to the longitudinal aisles L via transverse aisles Q or the lanes thereof extending transversely and in particular perpendicularly to the quay 9a. Provision can also be made that the gantry cranes 21 manage a plurality of storage areas 20a, which are adjacent one another in the longitudinal direction and are spaced apart from one another by a transverse aisle Q, and for this purpose travel over one or a plurality of transverse aisles Q. Alternatively, each storage area 20a is allocated at least one gantry crane 21. However, the region of the quay 9a including the handling devices at that location is reserved for the internal vehicles 1 and 17a, for which reason corresponding barriers or passing areas with security checkpoints can be provided within the terminal 9 (broken line in FIG. 2). This gives rise likewise to at least mixed traffic between automatically guided transport vehicles 1 and manually guided transport vehicles 17a within the terminal 9 in the region of the quay 9a.

FIG. 2a illustrates an alternative terminal 9 which is designed as a so-called ASC terminal. In contrast to the terminal 9 illustrated in FIG. 2, the gantry cranes 21 in this case are designed as so-called automated stacking cranes (automated stacking cranes—ASC for short). Typically, in this type of terminal no aisles are provided for the transport vehicles 1 and 17a, 17b between the storage areas 20a and instead aisles are provided only for rail tracks 26, on which the ASCs move and between the pairwise arrangement of which a storage area 20a is arranged in each case. In contrast to the RMG or RTG terminals, the storage areas 20a also do not extend along and in particular in parallel with the quay 20a but instead extend transversely and in particular perpendicularly to said quay. Typically, the gantry cranes 21 accordingly also move transversely to the quay 9a. Furthermore, the container store 20 of an ASC terminal does not have any transfer lanes arranged on the long sides of the storage areas 20a. Instead, head-side transfer areas 27 are provided on the longitudinal ends of the respective storage area 20a which point in the longitudinal direction. FIG. 2a illustrates only the quayside transfer areas 27 but not any land-side transfer areas and also not any external transport vehicles 17b. The previously described configuration of the container store 20 of an ASC terminal ensures that the traffic of internal vehicles 1 and 17a on the waterside or quayside in relation to the container store 20 is separated from the land-side traffic of external vehicles 17b by the container store 20. Accordingly, only internal vehicles are involved in the waterside mixed traffic between automatically guided transport vehicles 1 and manually guided transport vehicles 17a. In the region on the land-side in relation to the container store 20, it is also possible for internal, manually guided transport vehicles 17a to be used in mixed traffic with external, manually guided transport vehicles 17b in order to ensure e.g. a connection of a rail terminal.

The boundary 19 of the respective terminal 9 has at least one passing area 19a for the external, manually guided transport vehicles 17b and so said vehicles, coming from public roads outside the terminal 9, can travel into the terminal 9 and out of the terminal onto public roads only through the passing area. In order to open and close each passing area 19a in a targeted or controlled manner, it is also possible to provide in each case a security checkpoint for registering arrival and departure, including identification of the arriving and departing vehicles and their drivers. The internal vehicles 1, 17a are not allowed to drive through the passing area 19a because they are not allowed to travel on public roads outside the terminal 9 and also can be operated according to regulations only within the terminal 9. This does not include said vehicles leaving the land-side area or the terminal 9, e.g. for maintenance or repair purposes, which is not deemed to be an operation according to regulations.

FIGS. 3 and 4 each show a schematic view of mixed traffic of automatically guided and manually guided transport vehicles 1 and 17a, 17b within the terminal 9 of FIG. 2 or 2a. The figures illustrate by way of example a plan view of two parallel and adjacent lanes 24a and 24b, of which the first lane 24a is provided for the manually guided transport vehicle 17a, 17b and the second lane 24b is provided for the automatically guided transport vehicle 1. Typically, further lanes are provided within the terminal 9 for the internal, automatically guided transport vehicles 1 and the internal and/or external, manually guided transport vehicles 17a, 17b which can run in parallel with one another or crossing one another (see also FIGS. 6a to 6d). Moreover, a person 18 is illustrated by way of example in the region of the first lane 24a and thus in proximity to the transport area of the transport vehicle 1 and so there is a risk of a collision in particular with automatically guided transport vehicles 1 because it is not known what persons 18 located in the region of the lanes 24a, 24b will do next in terms of how they will behave and move. Although persons 18 are forbidden from entering the region of the lanes 24a, 24b for safety reasons, this can occur because of human error or in emergency situations.

Mixed traffic within the terminal 9 also gives rise to the risk of collisions between automatically guided and manually guided transport vehicles 1 and 17a, 17b. The automatically guided transport vehicles 1 obtain their travel routes from the management system and accordingly are guided automatically within the assigned lanes 24b. Since the management system knows the travel routes of the entire fleet of automatically guided transport vehicles 1, the management system can also coordinate all of the movements of the automatic transport vehicles 1 in a collision-free manner. However, in contrast it is not known what manually guided transport vehicles 17a, 17b or their drivers will do next in mixed traffic in terms of how they will behave and move. The manually guided vehicles 17a, 17b also obtain travel routes, specified by the management system, within the assigned lanes 24a which can be e.g. graphically or acoustically specified to the driver. However, it is always possible for a driver to deviate with his manually guided transport vehicle 17a, 17b from the specified travel route, to leave the assigned lane 24a and change to the adjacent lane 24b or ignore other specifications. Automatically guided and manually guided transport vehicles 1, 17a, 17b can also encounter one another in crossing areas of the lanes 24a, 24b and so there is a risk of collisions if the drivers do not adhere to the specifications of the management system.

In view of this uncertainty, it is necessary to minimise the risk of collisions in the case of mixed traffic between automatically guided transport vehicles 1 and manually guided transport vehicles 17a, 17b or during operation of the transport vehicle 1 even in the presence of a person 18 in proximity to the transport area of the transport vehicle 1. For this purpose, the automatically guided transport vehicles 1 each have a sensor apparatus 14 for object recognition. The sensor apparatus 14 can recognise objects in the form of manually guided transport vehicles 17a, 17b or persons 18 located in the region of the lanes 24a, 24b. Of course, the sensor apparatus 14 is also able to recognise, as objects, other automatically guided transport vehicles 1 and to distinguish them from other objects, in particular from manually guided transport vehicles 17a, 17b and from persons 18. In this case, the sensor apparatus 14 can recognise e.g. on the basis of the shape and/or reflection of the respective object whether the recognised object is a transport vehicle 17a, 17b, 1, a person 18 or another object, such as e.g. components of handling devices such as supports and running gear units of gantry cranes 21 (see FIGS. 6a and 6b) or container bridges 23 and loading hatch covers 22a which are placed down in the region thereof on the quay 9a during unloading of the ships 22 and are defined as hatch covers (see FIG. 6d), as well as positionally fixed boundaries and lamp posts. A position, movement direction and/or speed of the recognised object can also be ascertained by means of the sensor apparatus 14. The ascertained position can be a distance from the ascertained transport vehicle 1. For this purpose, the sensor apparatus 14 can comprise e.g. a laser sensor and/or a camera and/or a radar sensor and/or an ultrasonic sensor and can communicate the aforementioned information to the vehicle controller 13 via an evaluating unit and so a type of environment model of the transport vehicle 1 is provided.

In order to avoid collisions, the vehicle controller 13 cooperates, as described below, with the sensor apparatus 14 in such a manner that for the aforementioned recognised objects some or all possible movements which are possible within the braking time of the automatically guided transport vehicle 1 are taken into account. The braking time includes in this case the minimum time which, including the reaction time of the vehicle controller 13, would be required in order to initiate a braking procedure and to bring the transport vehicle 1 to a standstill in a controlled manner thereby. The thus theoretical or calculative braking time depends in particular upon the current speed of the transport vehicle 1 and is continuously ascertained. Moreover, a movement area 15 of the automatically guided transport vehicle 1 is ascertained, within which the transport vehicle 1 could come to a standstill by means of a braking procedure during the braking time. The movement area 15 thus includes all positions which can be reached by the transport vehicle 1 in the event of a braking procedure with and/or without travel around bends until said vehicle comes to a standstill. Since the travel route of the automatically guided transport vehicle 1 is specified and known, the geometry of its movement area 15 can be reliably determined in dependence upon the braking time, the braking distance and the vehicle dimensions. The movement area 15 can be ascertained in particular in a continuous manner by means of the vehicle controller 13 because the values of the current speed and thus also of the braking time can be provided to said vehicle controller and therefore the movement area 15 can be continuously adapted in a calculative manner.

Furthermore, a movement area 16a or 16b can also be ascertained for the objects recognised by the sensor apparatus 14, e.g. for a manually guided transport vehicle 17a, 17b or for a person 18 or another automatically guided transport vehicle 1 respectively. The movement area 16a or 16b of the respective recognised object is the particular area, within which the object is still movable during the theoretical or calculative braking time of the recognising transport vehicle 1. In other words, the movement area 16a or 16b includes all positions which the respective object could still reach after being recognised by the sensor apparatus 14 until the braking time elapses. The ascertaining of the movement areas 16a or 16b is based for this purpose upon the position of the respectively recognised object ascertained e.g. by means of the sensor apparatus 14. Moreover, when ascertaining the movement area 16a or 16b the current movement directions in the direction of travel F and speeds, which are continuously determined by means of the sensor apparatus 14, are taken into account. For the purposes of simplification, it is alternatively also possible to take into account kinematic limits of worst-case driving manoeuvres or worst-case movement manoeuvres, such as possible maximum speeds and/or accelerations and changes in the movement direction or direction of travel F. This is illustrated by corresponding arrows within the movement areas 16a, 16b. If the object which has been recognised is e.g. a person 18 who is actually moving, this can produce at most the kinematic data produced by a world-record sprinter. It cannot be assumed that a person is moving independently without assistance at 50 km/h across the terminal because this is not physically or bio-mechanically possible. Corresponding assumptions can also be made for transport vehicles 17a, 17b because e.g. their maximum achievable speeds and accelerations or directional changes are known and can be stored e.g. in the vehicle controller 13 or the sensor apparatus 14 or the evaluating unit thereof and can thus be provided for determining the movement areas 16a, 16b. When taking into account kinematic limits of worst-case manoeuvres of the respective object, it can be assumed for simplification that the movement areas 16a, 16b otherwise depend only upon parameters of the automatically guided transport vehicle 1, in particular upon its current speed in the direction of travel F or the associated minimum braking time.

The ascertaining of the movement areas 15, 16a, 16b illustrated schematically by dashed or dotted lines is thus based upon a determination of kinematic limits of the transport vehicle 1 and of the respective object. If the recognised object is recognised as being a non-movable and thus stationary object, the movement area of the object corresponds to the outer contour of the object.

Furthermore, the vehicle controller 13 cooperates with the sensor apparatus 14 such that by acting on the vehicle controller 13 in terms of control technology, the permissible speed of the automatically guided transport vehicle 1 is automatically reduced and so the movement area 15 of the transport vehicle 1 and the movement area 16a of a manually guided transport vehicle 17a, 17b or the movement area 16 of a person 18 do not come into contact and in particular do not overlap with one another after the reduction in the permissible and/or actual speed. In this regard, the permissible speed can be adapted initially as a desired value for the vehicle controller 13, which is followed accordingly by the actual speed in terms of an actual value or which prevents any acceleration beyond the permissible speed.

Preferably, provision is made that the permissible speed of the transport vehicle 1 is already reduced before the movement areas 15 and 16a or 16b come into contact with one another and thus a distance is maintained between said areas, as indicated in FIGS. 3 and 4. This requires the detection region 28 of the sensor apparatus 14, within which object recognition is possible, to be correspondingly large and not impaired. An impairment of the detection region 28 can be present e.g. in crossing areas, which are not easy to see, of lanes between container stacks and corners formed thereby. In this case, it is also possible in accordance with the invention for at least one sensor apparatus 14 to be provided on the roadside and thus in a positionally fixed manner outside the transport vehicle 1 and to transmit information relating to detected objects to the transport vehicle 1 in order to be incorporated into a collision-free operation in this manner in terms of the invention. In the case of smaller or sufficiently large but impaired detection regions 28, it is also possible for the movement areas 15 and 16a or 16b to come into contact or overlap with one another for a short period of time. In this case, the situation can occur that at the moment of entry into the detection region 28 and the ensuring recognition by the sensor apparatus 14 the corresponding object is so near in the region of the transport vehicle 1 that the movement areas 15 and 16a or 16b are already in contact or overlap with one another. However, the detection region 28 of the sensor apparatus 14 is dimensioned at least such that an object can be recognised on a free surface without impairing the detection region 28 before said object is located within the movement area 15 of the automatically guided transport vehicle 1. The movement area 15 of the automatically guided transport vehicle 1 can thus be kept free of recognised objects by the reduction in speed. The reduction in the permissible speed of the transport vehicle 1 also results in a reduction in the braking time and, associated therewith, in a decrease in the size of the movement areas 15 and 16a or 16b. This becomes clear by a comparison of FIGS. 3 and 4 because in FIG. 4 the transport vehicle 1 already has a lower speed and the manually guided transport vehicle 17a, 17b or the person 18 has an unchanged speed in comparison with FIG. 3. In FIG. 3, a speed of 10 m/s, a minimum braking time including reaction time in the above-defined sense of 3 s and a corresponding minimum braking distance of 10 m in each case in the direction of travel F are feasible as examples of values for the transport vehicle 1. In FIG. 4, the corresponding values are e.g. 2 m/s, 1 s and 1 m. In spite of the distance between the automatically guided transport vehicle 1 and the manually guided transport vehicle 17a, 17b and the person 18, which in FIG. 4 is reduced compared to FIG. 3, the reduction in the permissible and actual speed of the transport vehicle 1 brought about a decrease in the size of the movement areas 15 and 16a or 16b and, associated therewith, prevented the movement areas 15 and 16a or 16b from coming into contact with one another. Therefore, the situations illustrated in FIGS. 3 and 4 are non-critical insofar as the transport vehicle 1 can still stop even in the event of worst-case manoeuvres and so subsequently a collision can still be caused only by a movement of the transport vehicle 17a or 17b or the person 18. A collision between automatically guided transport vehicles 1 is excluded by the coordination thereof effected by the management system.

FIG. 5 shows a further schematic view of mixed traffic of automatically guided and manually guided transport vehicles 1 and 17a, 17b within the terminal 9 of FIG. 2 or 2a. The view differs from FIGS. 3 and 4 in that the first lane 24a is delimited by spaced apart directing elements 25 which serve as a barrier, whereby a separation from the second lane 24b is also achieved. The directing elements 25 thus prevent the manually guided transport vehicle 17a, 17b from veering from the first lane 24a into the second lane 24b. The directing elements 25 can also serve as a barrier for persons 18. Instead of directing elements 25, it is also feasible to have a continuous wall or fencing as a barrier. As indicated in FIG. 5, the presence of corresponding barriers can be recognised by the sensor apparatus 14 of the automatically guided transport vehicle 1 and can be taken into account when ascertaining the movement area 16a of the manually guided transport vehicle 17a, 17b or the movement area 16b of the person 18, in that the respective movement area 16a or 16b is accordingly decreased in size and does not cause any action on the vehicle controller 13 in order to reduce the permissible or actual speed of the transport vehicle 1. In spite of the spatial proximity of persons 18 or manually guided transport vehicles 17a, 17b, corresponding barriers can ensure that the automatically guided transport vehicles 1 operate in an unhindered manner. Without corresponding barriers, the ascertained movement areas 16a, 16b would be considerably larger and, with the same spatial proximity, would correspondingly result more frequently in a reduction in the permissible speed of the transport vehicle 1.

FIGS. 6a to 6d illustrate typical operating situations which can occur within the terminals 9 of FIG. 2 or 2a. FIG. 6a shows a longitudinal aisle L between two adjacent storage areas 20a in which a first lane 24a is provided and a parallel second lane 24b is provided as a transfer lane. Both lanes 24a, 24b are defined as an aligned one-way road. During a change in lanes 24a, 24b, the sensor apparatus 14 is likewise used, as described above, in order to avoid a collision of the transport vehicle 1 with a transport vehicle 17a, 17b or the gantry crane 21. This likewise applies if, as illustrated in FIG. 6b, automatically guided transport vehicles 1 enter a crossing area of a longitudinal aisle L and a transverse aisle Q in order to pass said crossing area for onwards travel as travel straight-ahead in the same longitudinal aisle L or to turn into the transverse aisle Q. The crossing transverse traffic, which can be recognised or observed by means of the sensor apparatus 14, as part of the mixed traffic can also be multi-lane oncoming traffic. Such oncoming traffic, in particular according to FIGS. 3 to 5, is also feasible in the transverse aisles Q between two crossing areas. This is schematically illustrated in FIG. 6c. FIG. 6d shows the region of the quay 9a with a container bridge 23, under which and between the supports of which corresponding mixed traffic operates as part of the procedure of transferring containers 12. In this case, when turning into the transfer lanes and travelling through underneath the container bridge 23, collisions must also be avoided using the sensor apparatus 14. In this regard, loading hatch covers 22a which are placed down on the quay 9a can also be detected as objects in terms of obstacles to drive around.

In the operating situations illustrated by way of example, collisions can be prevented by means of inventively incorporating the sensor apparatuses 14. For a better overview, FIGS. 6a to 6d do not illustrate any movement areas 15, 16a, 16b but instead illustrate only detection regions 28. It is evident that the sensor apparatus 14 arranged accordingly on the transport vehicle 1 can be used to detect not only objects located in the direction of travel F in front of the transport vehicle 1 but also in principle on each side of the transport vehicle 1, in particular at the front, rear and long sides. As a result, particularly when turning or changing lanes, rearward traffic can also be detected and a collision therewith can be avoided. For this purpose, a separate sensor apparatus 14 can be provided on each side of the transport vehicle 1. Provision can also be made that all or, depending upon the location of the transport vehicle 1, only some of the sensor apparatuses 14 are activated. During travel straight-ahead outside crossing areas, sensor apparatuses 14 located e.g. only at the front of the transport vehicle 1 can be activated.

The vehicle controller 13 and the sensor apparatus 14 form a system for continuously monitoring the surrounding area and evaluating the surrounding area and, on the basis thereof, for avoiding collisions of the automatically guided transport vehicle 1 in the operating situations described in this case. This permits safe coordinated mixed traffic of at least two transport vehicles 1 and 17a or 17b in the above-described sense.

The transport vehicle 1 which in this case is designed by way of example as a terminal truck can alternatively also be designed as a container transport vehicle or gantry lift device in terms of the definition above. In principle, the entire fleet of internal transport vehicles 1, 17a in the terminal 9 can include only one of the aforementioned vehicle types, i.e. for example only terminal trucks, or even several different vehicle types, i.e. for example terminal trucks and gantry lift devices or container transport vehicles and gantry lift devices.

The invention claimed is:

1. A transport vehicle for containers comprising a vehicle controller operable to automatically guide and control a speed of the transport vehicle, wherein the transport vehicle has a sensor apparatus for object recognition which cooperates with the vehicle controller to ascertain a movement area of the transport vehicle within which the transport vehicle can come to a standstill by a braking procedure during a braking time, and to ascertain a movement area of an object recognized via the sensor apparatus within which the object can be moved during the braking time of the transport vehicle, wherein a permissible speed of the transport vehicle can be reduced automatically by the vehicle controller such that the two movement areas do not come into contact with one another after the reduction in the permissible speed, wherein the movement area of the object is ascertained on the basis of kinematic limits of a worst-case maneuver of the recognized object.

2. The transport vehicle as claimed in claim 1, wherein the sensor apparatus is configured to recognize as an object at least one manually guided transport vehicle and/or a person and/or an automatically guided transport vehicle.

3. The transport vehicle as claimed in claim 1, wherein the sensor apparatus is configured to detect a position, speed and movement direction of the object and from this the movement area of the object is ascertained.

4. The transport vehicle as claimed in claim 3, wherein the sensor apparatus has a detection region that is dimensioned such that an object can be recognized before the movement areas of the transport vehicle and the object come into contact with one another.

5. The transport vehicle as claimed in claim 4, wherein the vehicle controller and the sensor apparatus are configured to continuously ascertain the movement areas of the transport vehicle and the object and to adapt them in dependence upon the current speed of the transport vehicle.

6. The transport vehicle as claimed in claim 1, wherein the sensor apparatus has a detection region that is dimensioned such that an object can be recognized before the movement areas of the transport vehicle and the object come into contact with one another.

7. The transport vehicle as claimed in claim 1, wherein the vehicle controller and the sensor apparatus are configured to continuously ascertain the movement areas of the transport vehicle and the object and to adapt them in dependence upon a current speed of the transport vehicle.

8. The transport vehicle as claimed in claim 1, wherein said transport vehicle is disposed in a system comprising a first lane provided for a manually guided transport vehicle and a second lane provided for the automatically guided transport vehicle and wherein the two lanes are separated from one another by a barrier in order to delimit the movement area of the manually guided transport vehicle.

9. A method for operating a transport vehicle for containers that has a vehicle controller, comprising:
automatically guiding the transport vehicle and automatically controlling a speed of the transport vehicle via the vehicle controller;
ascertaining a movement area of the transport vehicle within which the transport vehicle can come to a standstill by means of a braking procedure during a braking time, wherein the movement area of the transport vehicle is ascertained utilizing a sensor apparatus in cooperation with the vehicle controller;
ascertaining a movement area of an object recognized via the sensor apparatus within which the object is moveable during the braking time of the transport vehicle;
wherein a permissible speed of the transport vehicle is configured to be reduced automatically by the vehicle controller such that the two movement areas do not come into contact with one another after the reduction in the permissible speed; and
wherein the movement area of the object is ascertained on the basis of kinematic limits of a worst-case maneuver of the recognized object.

10. The method as claimed in claim 9, further comprising recognizing as an object via the sensor apparatus at least one manually guided transport vehicle and/or a person and/or an automatically guided transport vehicle.

11. The method as claimed in claim 9, wherein said ascertaining the movement area of the object further comprises ascertaining a position, speed and movement direction of the object via the sensor apparatus and from this the movement area of the object is ascertained.

12. The method as claimed in claim 11, wherein the sensor apparatus has a detection region that is dimensioned such that an object can be recognized before the movement areas of the transport vehicle and the object come into contact with one another.

13. The method as claimed in claim 12, further comprising continuously ascertaining the movement area of the transport vehicle and continuously ascertaining the movement area of the object via the vehicle controller and the sensor apparatus and to adapt the movement area of the transport vehicle and the movement area of the object in dependence upon a current speed of the transport vehicle.

14. The method as claimed in claim 9, wherein the sensor apparatus has a detection region that is dimensioned such that an object can be recognized before the movement areas of the transport vehicle and the object come into contact with one another.

15. The method as claimed in claim 9, further comprising continuously ascertaining the movement area of the transport vehicle and continuously ascertaining the movement area of the object via the vehicle controller and the sensor apparatus and adapting the movement area of the transport vehicle and the movement area of the object in dependence upon a current speed of the transport vehicle.

16. A system comprising a transport vehicle for containers which has a vehicle controller operable to automatically guide and control a speed of the transport vehicle, wherein a sensor apparatus for object recognition is provided which cooperates with the vehicle controller to ascertain a movement area of the transport vehicle within which the transport vehicle can come to a standstill by a braking procedure during a braking time, and to ascertain a movement area of an object recognized via the sensor apparatus within which the object can be moved during the braking time of the transport vehicle, wherein a permissible speed of the transport vehicle can be reduced automatically by the vehicle controller such that the two movement areas do not come into contact with one another after the reduction in the permissible speed, wherein the movement area of the object is ascertained on the basis of kinematic limits of a worst-case maneuver of the recognized object.

* * * * *